United States Patent [19]

Peron

[11] 3,784,752

[45] Jan. 8, 1974

[54] TIME DIVISION DATA TRANSMISSION SYSTEM

[76] Inventor: Roger J. Peron, Z.U.P. Batiment 63, Lannion, France

[22] Filed: Oct. 30, 1972

[21] Appl. No.: 301,995

[52] U.S. Cl. ....... 179/15 AQ, 179/15 A, 179/15 AT, 179/15 BV

[51] Int. Cl. ........................................... H04j 3/16

[58] Field of Search .................. 179/15 AT, 15 AQ, 179/15 BV, 15 BW, 15 A

[56] References Cited

UNITED STATES PATENTS

| | | | |
|---|---|---|---|
| 3,641,273 | 2/1972 | Herold | 179/15 BW |
| 3,688,049 | 8/1972 | Schlichte | 179/15 AQ |
| 3,707,604 | 12/1972 | Greefkes | 179/15 BW |

*Primary Examiner*—Ralph D. Blakeslee
*Attorney*—Abraham A. Saffitz

[57] ABSTRACT

Data transmission system over routes composed of a chain of cascaded time division switching networks and through a number of time slots depending upon the data flow and selected by the data transmitter station. The message data to be transmitted are chopped into as many words as there are transmission time slots. The transmitting routes are defined by the incoming slots in the home time division exchange of the transmitter station and the outgoing slots in the home time division exchange of the receiver station. The slot numbers of the incoming and outgoing slots are stored together with the chronological numbers of establishment of the routes through said slots. Reception of the message words takes place in groups of shift registers whose number is equal to the number of time slots and selectively in a particular shift register of said register groups depending upon the delay encountered in the transmission by the word considered.

2 Claims, 7 Drawing Figures

TIME DIVISION DATA TRANSMISSION SYSTEM

The present invention relates to a system for transmission of data through a chain of cascaded asynchronous time-division switching networks in which the number of time slots employed for transmission of data is variable, subject to the flow of information to be transmitted. More specifically, the invention relates to a data transmission system employing several time slots, randomly selected and thus not necessarily contiguous, in which the message is split up into consecutive words transmitted in said slots.

In these telephone systems employing time division switching networks, digital data are transmitted in binary coded pulse groups during recurrent time slots. For example, the recurrence period of the slots or slot frame may have a duration of 125 $\mu$s and the frame may comprise 32 slots, each having a duration of 3.9 $\mu$s. Each slot contains a group of eight binary coded pulses or bits, these eight bits forming a word.

Data transmission systems of the type in question are known, wherein the number of the time slots varies in accordance with the flow of information to be transmitted, expressed in kilobauds. A system of this nature has been described, for example, in the report of Mr. Revel at "Colloque International de Teleinformation" held in Paris in 1969, entitled "Possibilities of data transmission in integrated time division switching systems," Page 367–375 of the review of the reports to this Colloquy, publichers Chiron, Paris. In this system, the calling subscriber and the called subscriber are connected to the same exchange. The calling subscriber has a telephone set connected to the time division switching exchange by a subscriber's line and a data transmitter and receiver, which is connected to the exchange by a four-wire line. The telephone set transmits and receives the signals relating to connection and disconnection of the communication of data.

Thanks to his dial, the caller has the opportunity of specifying the number of slots he wishes to employ for data transmission. Each data transmitter-receiver is connected within the exchange to a transmission equipment and a reception equipment situated within an assembly referred to as a "data selector unit" forming part of the exchange. This selector unit allocates or assigns the time slots to be employed and memorises the number of slots asked for by the calling subscriber, sends the data at a frequency proportional to the number of slots employed and feeds them into the slots.

In the transmission systems of the kind concerned, several sequences of items are to be considered as well as the order number or serial number of a given item in the sequence.

The slots form a frame of 32 slots and each slot has a serial number in the frame.

The slots are randomly seized and assigned and the seizure and assignment order number is different from the slot serial number.

The words form a sequence since they constitute a message in which each word has a given serial number.

In the prior art system, the caller and the recipient are both connected to the same time-division switching network and the time slots are seized and assigned by the data selector unit in a particular seizure and assignment order. If it is assumed that the data are transmitted through four time slots selected in the order $T_{20}$, $T_{11}$, $T_{15}$, $T_4$ out of thirty two time slots $T_0$ to $T_{31}$, the order of the serial numbers of the slots in the slot sequence is:

$$T_4, T_{11}, T_{15}, T_{20}$$

since 20 if higher than 15 which is higher that 11 which is higher than 4 and the seizure and assignment order is:

$$1 = T_{20} \;;\; 2 = T_{11} \;;\; 3 = T_{15} \;;\; 4 = T_4$$

since slot No. 20 has been selected the first and assigned to word No. 1, slot No. 11 has been selected the second and assigned to word No. 2, slot No. 15 has been selected the third and assigned to word No. 3 and slot No 4 has been selected the fourth and assigned to word No. 4.

The correspondence between the slot serial number and the seizure orders of the slots and their assignment orders to the words are memorized.

In other words, the following correlations are memorized:

$$T_{20} \rightarrow \text{word No. 1}$$
$$T_{11} \rightarrow \text{word No. 2}$$
$$T_{15} \rightarrow \text{word No. 3}$$
$$T_4 \rightarrow \text{word No. 4}$$

Summing up the slots are transmitted in the order:

$$T_4, T_{11}, T_{15}, T_{20},$$

they are assigned respectively to words No. 1, No. 2, No. 3, No. 4 in the order $$T_{20}, T_{11}, T_{15}, T_4,$$

thus, the transmission order of the words Nos. 1 to 4 is:

4, 2, 3, 1

If it is assumed that, in the system of the prior art comprising a single time-division switching network, the incoming time slots $T_{20}$, $T_{11}$, $T_{15}$, $T_4$ are connected, respectively, within the said network to the outgoing time slots $T_{10}$, $T_{24}$, $T_{18}$, $T_3$ (anticipatory reference to FIG. 6, dash-dotted line), it is apparent that the transmission sequence: word No. 4 (first word transmitted through $T_4$), word No. 2 (second word transmitted through $T_{11}$), word No. 3 (third word transmitted through $T_{15}$), word No. 1 (fourth word transmitted through $T_{20}$), is replaced by the reception sequence : word No. 3 (first word received through $T_{18}$), word No. 2 (second word received through $T_{24}$) word No. 4 (third word received through $T_3$) word No. 1 (fourth word received through $T_{10}$).

The following correlations must be memorized, apart from the preceding correlations, to re-establish the sequence of assignment:

$$T_{20} \rightarrow T_{10} = T_{42}$$
$$T_{11} \rightarrow T_{24}$$
$$T_{15} \rightarrow T_{18}$$
$$T_4 \rightarrow T_3 = T_{35}$$

that is to say that it is necessary to know the outgoing time slots connected to the incoming time slots and to make allowance for the fact that when an incoming time slot having a given serial number is connected to an outgoing time slot having a lesser serial number, the total number of slots must be added to it figuratively (it is assumed that this number if thirty two) to take into account that, in the order of reception, these time slots (or rather the words conveyed through these slots) have incurred a delay of one cycle.

To summarize, and taking into account that the slot seizure order is the same as the slot-to-word assignment order since the slot which is the $p^{th}$ to be seized is assigned to word No. p, the system for transmission of data by means of several time slots of the prior art comprises:

means for storing in the calling and called stations the correspondance between the serial number of the slots and the order of seizure of the same. The correspondance table in the calling and called stations are

| Calling station | | Called station | |
|---|---|---|---|
| $T_{20}$ | 1 | $T_{10}$ | 1 |
| $T_{11}$ | 2 | $T_{24}$ | 2 |
| $T_{15}$ | 3 | $T_{18}$ | 3 |
| $T_4$ | 4 | $T_3$ | 4 |

The total delay between an incoming slot and an outgoing slot is at most of one frame.

When the number of exchanges of the chain connecting the calling subscriber to the called subscriber becomes greater than one, the total delay may acquire a magnitude comprised between 0 and a number of frames equal to the number of exchanges inserted in the communication and is no longer constant.

On the other hand, the receiving exchange should know the correlations between the time slot serial numbers which are connected in all the exchanges. It thus becomes very difficult to produce a system for transmission of data by means of several time slots incorporating several exchanges whilst retaining the device employed in the case of a single exchange.

The object of the invention is to provide a system for transmission of data by means of time slots varying in number according to the data flow in the case in which the link between the calling and called subscribers transits through a number of time-division switching networks larger than unity.

According to the invention, there is provided a transmitter-receiver system for digital data using a varying number of time slots transiting through several time-division switching networks defining frames and slots in said frames, said system comprising means situated in the transmitter to predetermine the number of time slots to be employed in a communication, means situated in the transmitter for cyclic severance of the data to be transmitted into a number of words No. 1, No. 2 . . . No. N equal to the pretermined number of time slots, means situated in the transmitter and receiver for successively selecting a number of time slots equal to the said predetermined number, means for assigning the slots selected the first to the word No. 1 and the slots selected the $p^{th}$ to the word No. p whereby each selected slot is associated with a word, means situated in the transmitter for transmitting the words in the associated selected slots, an array of reception shift registers situated in the receiver and respectively associated with the words and each split up in a number of sections respectively associated with the reception frames, means for entering each received word into the section of said selected shift register associated with its reception frame and a synthesis shift register having a plurality of sections respectively connected to the last sections of the shift-register of the array.

The invention will be further described with reference to the accompanying drawings, which illustrate an embodiment of the invention which is given by way of example only and not by way of limitation.

Figure 1:
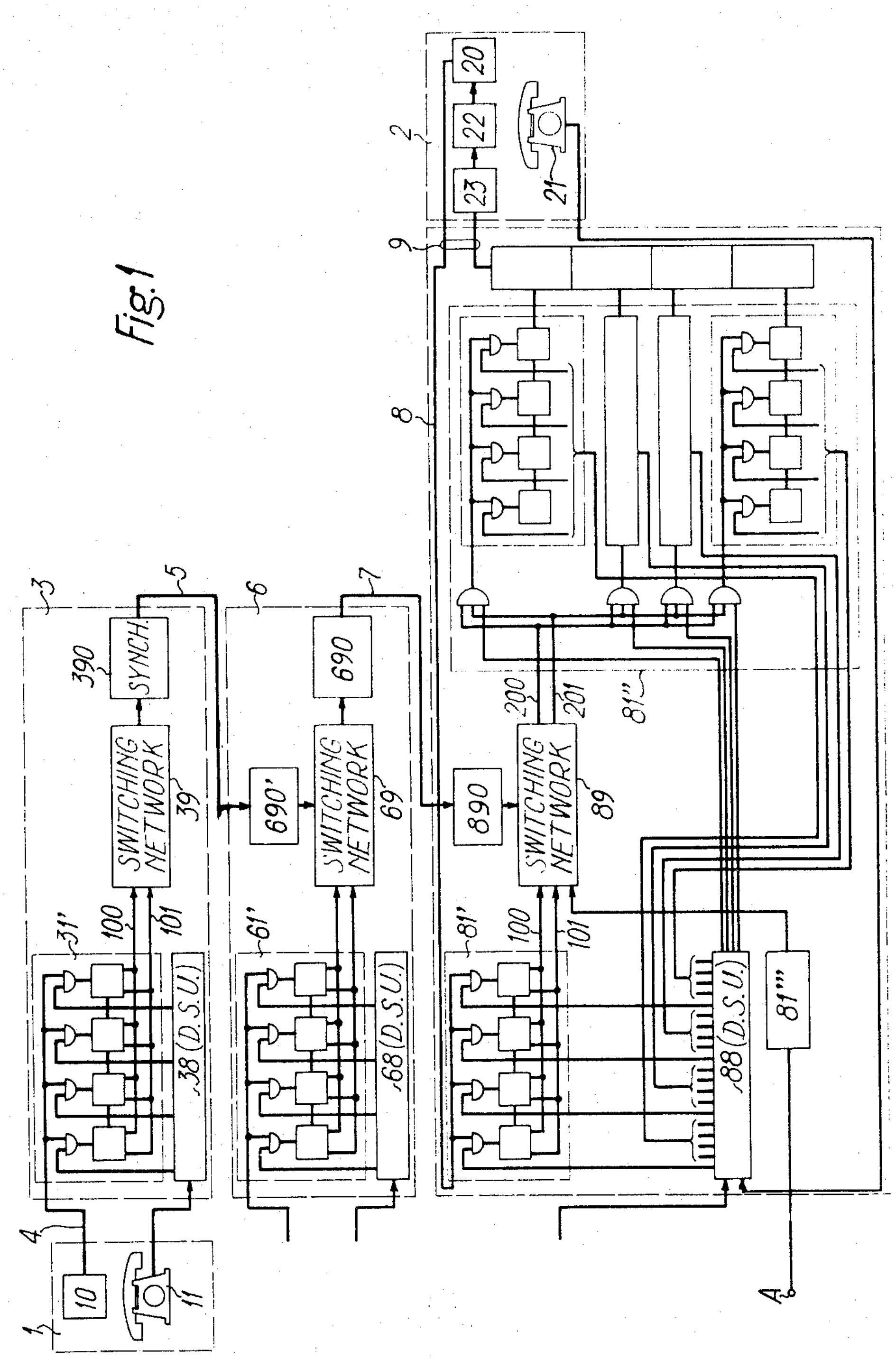
FIG. 1 is a digrammatical view of a data transmission link between two data transmitters-receivers through a chain of several time-division switching networks.

With reference to FIG. 1, the calling set 1 has a data transmitter-receiver 10 and a telephone set 11; it is connected to the called subscriber 2 through three time-division switching networks or exchanges 3, 6 and 8, the first being its own home exchange to which it is connected by a four-wire line 4 and the last being the home exchange of the data transmitter-received 2 to which this latter is connected by a four-wire 9. The lines comprise four wires to enable the subscribers' sets 1 and 2 to comprise both a data transmitter and a data receiver. The exchanges 3 and 6 are connected by such time-division trunks as 5 and the exchanges 6 and 8 by such time-division trunks as 7, on which the data are transmitted by means of one or more time slots.

Each exchange 3, 6, 8 comprises a time-division switching network, respectively 39, 69, 89, a data selection unit (DSU), respectively 38, 68, 88, and an equipment for synchronisation of circuits, respectively 390, 690', 690, 890, data sending equipment 31', 61', 81' and data receiving equipment of which only one 81'' has been illustrated, although equally comprised in the exchanges 3 and 6.

For the record moreover, a modulation and demodulation or modem equipment 81'', to which a telephone subscriber A is connected has been illustrated in the exchange 8.

Figure 7:
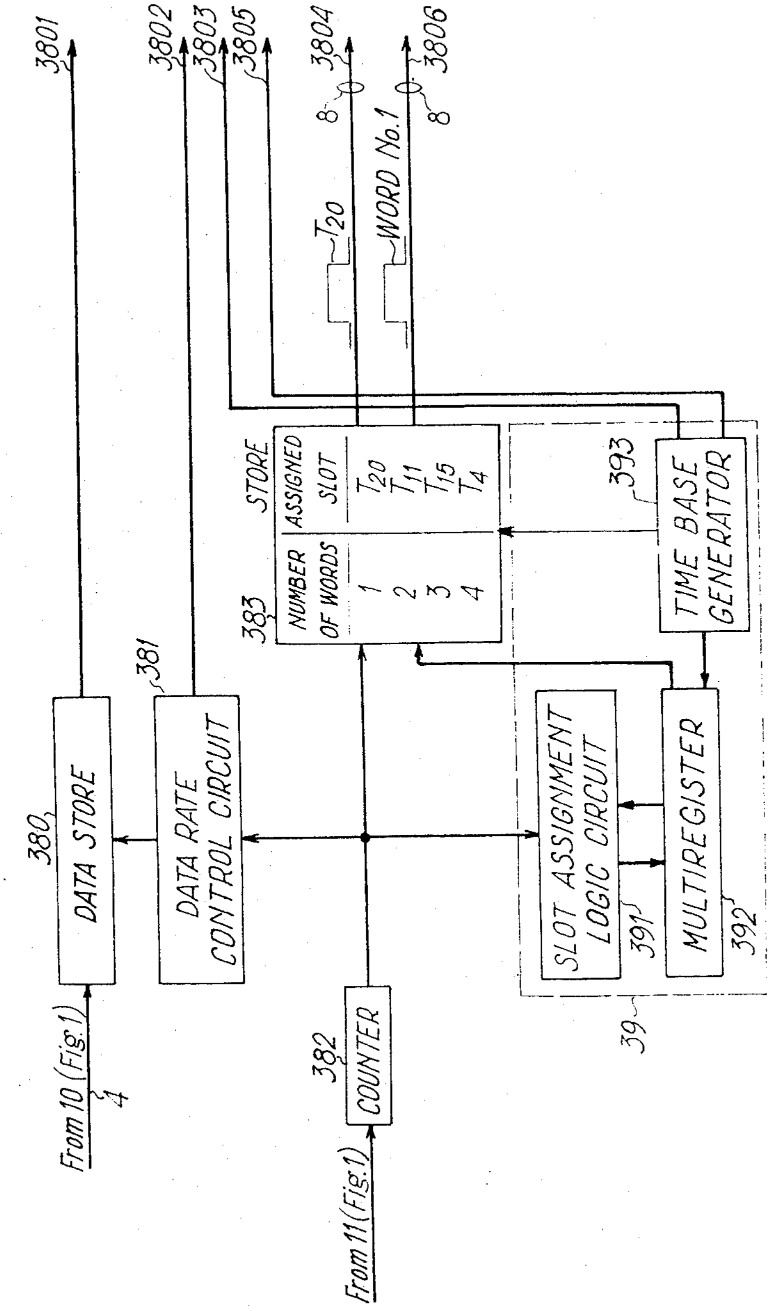
FIG. 7 represents the data selector unit comprised in the transmitter and receiver equipments.

The data selection units 38, 68, 88 although known in the prior art are, for the sake of completeness, disclosed with reference to FIG. 7. The time-division exchanges evidently comprise central control members which are not illustrated and which are described, for example, in the essay "Central Control in time division switching systems" by D. HARDY and others which appeared in the Review "Commutation et Electronique" July 1969, pages 49 to 66.

The invention relates in particular manner to data sending equipment such as 31' and data receiving equipment such as 81''. These are controlled, respectively, by the data selection units 38 and 88. The telephone set 11 of the calling subscriber's station 1 is connected to the data selection unit 38 and it is the set 11 which selects the number of time slots to be employed and transmits the same to the data selection unit.

The called subscriber's set 2 has available a reading and punching device 20 simultaneously serving the purpose of data transmission and reception. This reading and punching device reads out the data coming from the station 1 and can equally transmit data to the latter. It is connected by the four-wire line 9 to the data sending equipment 81' and to the data receiving equipment 81'' through a buffer store 22 and a fault correction device 23. The subscriber's station 2 moreover comprises a telephone set 21, connected to the data selection unit 88. The telephone set 21, like the telephone set 11, is employed for transmission of the number of time slots asked for to the data selection unit, when the subscriber's station 2 is the caller.

Figure 2:
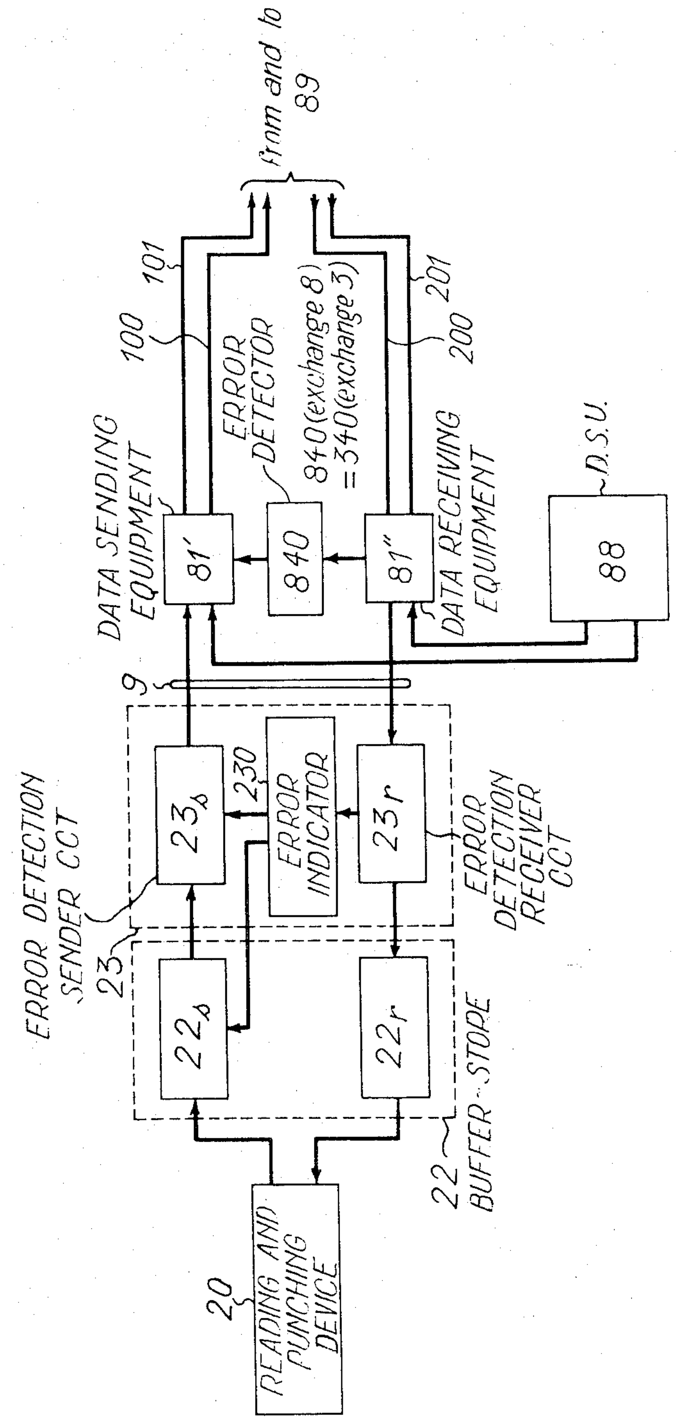
FIG. 2 is an illustration in the form of a block diagram of a data transmitter equipment and a data receiver equipment.

Referring now to Fig. 2, the reading and punching device 20 is connected to the buffer store 22 which comprises a sending buffer store $22_s$ and a receiving buffer store $22_r$. The sending buffer store $22_s$ serves the purpose of dividing the data supplied by the reading and punching device 20 into blocks or groups comprising a definite number of bits and it is connected to the error detection sender circuit $23_s$. As well known, this circuit adds one or a definite number of additional bits to the data groups, depending on the code on which error detection is based. It may also transmit an error signal. The output terminal of the error detection sender circuit $23_s$ is connected to the data sending equipment 81' by a two-wire line forming part of the four-wire line 9. The data receiving equipment 81'' is connected by a two-wire line forming part of the four-wire line 9 to the error detection receiver circuit $23_r$ which cheks on the code of the data received and clips a definite number of bits off the same. The circuit $23_r$ is connected to an error-indicator 230 and to the receiving buffer store $22_r$. This latter is connected to the reading and punching device 20. The data receiving equipment 81'' is connected to an error detector 840 which controls the data sending equipment 81' as will be specified in respect of FIG. 3.

When an error is detected in the error detection receiver circuit $23_r$, the latter triggers the error indicator 230 which blocks the sending buffer store $22_s$ thus causing interruption of the transmission of data and causes the error detection sender circuit $23_s$ to transmit an error signal. This signal is detected in the home exchange of the subscriber by the error detector 340 which is identical to the error detector 840.

Referring now to FIG. 7, the data selector unit 38 comprises a data store 380, a data rate control circuit 381, a counter 382 and a "word number and assigned slot" store 383. The data store receives the transmitted data at a predetermined rate from the data transmitter-receiver 10 and transmits the same on lead 3801 at a rate controlled by the data rate control circuit 381. The latter circuit is a pulse generator which can operate at several recurrence frequencies multiple of each other. Pulse generators operating at different frequencies are known in the art; they usually comprise a resonant circuit with a pluralty of resistors, inductors or capacitors and switching means for selecting one of these elements. The frequency has a given value when counter 382 counts one, twice this value when the counter counts two, thrice this value when the counter counts three and four times this value when the counter counts four.

Circuits comprised in the switching network are represented in the block 39. Reference numeral 391 designates a slot assignment logic circuit, reference numeral 392 a multiregister or central control circuit of the switching network and reference numeral 393 the time base generator of the time-division exchange. As it is well known, the multiregister or central control circuit is usually formed by a circulating store controlled by the time base generator whose circulating period is equal to the frame and which defines the slots. The slot assignment logic circuit searches after the requests for service and, when it has found one request, searches after an idle slot. When it has found an idle slot in the multi-register, it seizes it and writes therein several data among which the address of the calling subscriber.

The seizure of idle slots by the slot assignement logic circuit is known in the art and reference may be made to U.S. Pat. No. 3,524,946 issued on Aug. 18th, 1970 to Andre E. Pinet et al. The only difference between slot assignment circuit 391 and conventional slot assignment circuits, is that the latter only search after one idle slot whereas the former successively searches after a plurality of idle slots.

Store 383 receives from counter 382 the successive numbers 1, 2, 3, 4 and from multiregister 392 the serial numbers of the slots in their assignment order. Store 383 is controlled by time base generator 393.

As clearly shown in FIG. 7, there are six leads or lead groups issuing from the data selector unit.

Lead 3801 issuing from data store 380 conveys the data at the proper rate to the transmission shift registers 300–303. Lead 3802 issuing from the data rate control circuit 381 applies advance pulses at the proper rate to the transmission shift registers 300–303 and to the buffer transmission shift registers 310–313. Lead 3803 issuing from the time base generator 393 applies frame start pulses to the data transmitter equipment; it may be assumed that these start pulses coincide with the second half of time slot $T_0$. Lead 3805 issuing from the time base generator 393 applies transfer pulses to the data transmitter equipment; it may be assumed that these transfer pulses coincide with the first half of time slot $T_0$. Leads 3804 and leads 3806 are respectively two and eight in number when there are two multiplex highways 100 and 101 and one and four in number when there is only one multiplex highway (in the case of a tranmission through four slots at most).

Pulses corresponding to all the assigned slots are sent onto leads (or lead) 3804 and pulses corresponding to the first, second third and fourth words are sent onto the eight (or four) leads 3806. In the case of the given example, it appears (see FIG. 4) on lead 3804 serial pulses corresponding to $T_1$, $T_7$, $T_{26}$, $T_{30}$, on the lead 3806 connected to gate 800 a pulse coinciding with slot $T_{26}$, on the lead 3806 connected to gate 810 a pulse coinciding with slot $T_7$, ont the lead 3806 connected to gate 820 a pulse coinciding with slot $T_{30}$ and on the lead 3806 connected to gate 830 a pulse coinciding with slot $T_1$.

Figure 4:
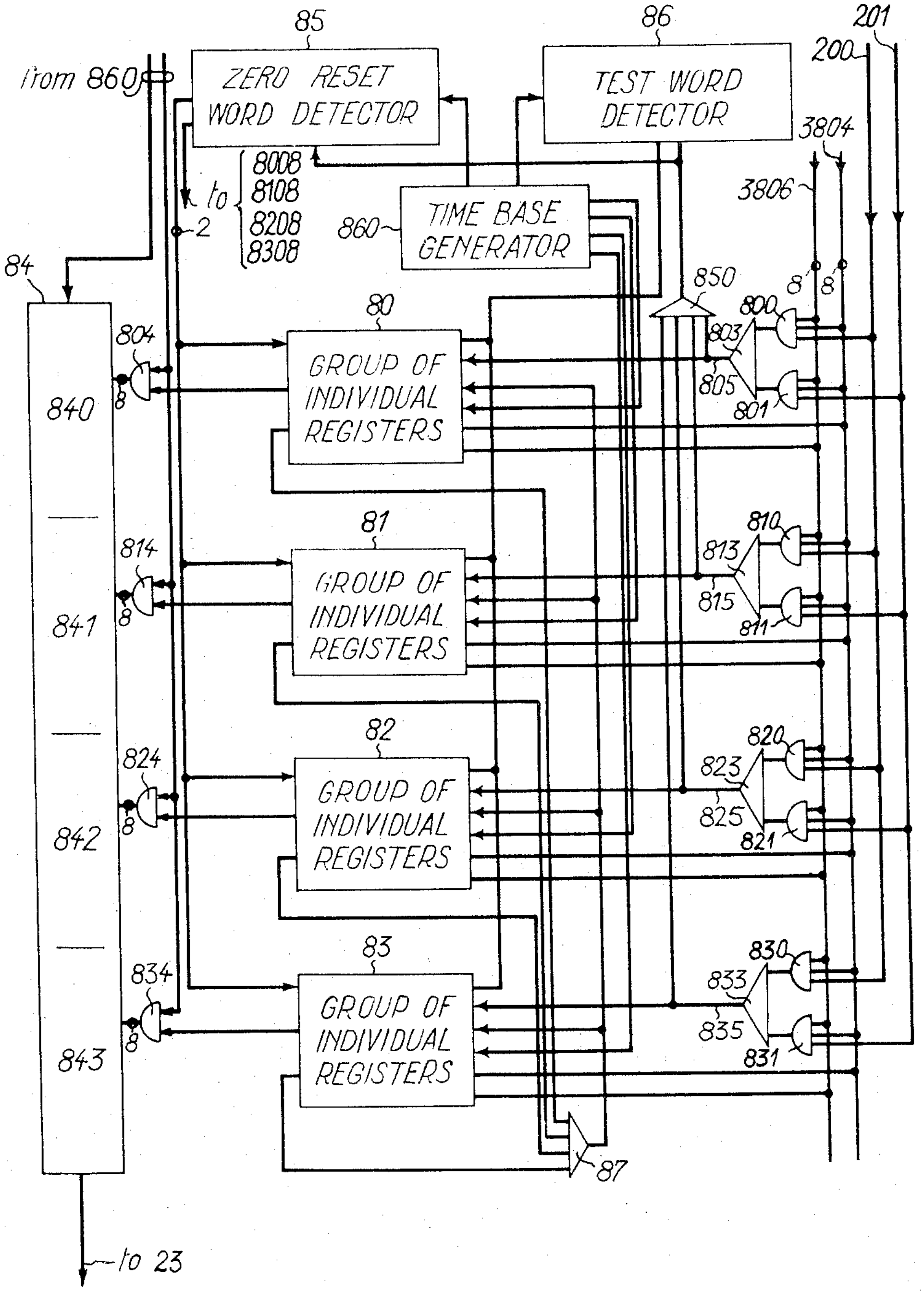
FIG. 4 illustrates in details a data receiver equipment.

It must be noticed that FIG. 7 disclose data selector unit 38 and that leads 3804 and 3806 of FIG. 4 issue from data selector unit 88.

Figure 3:
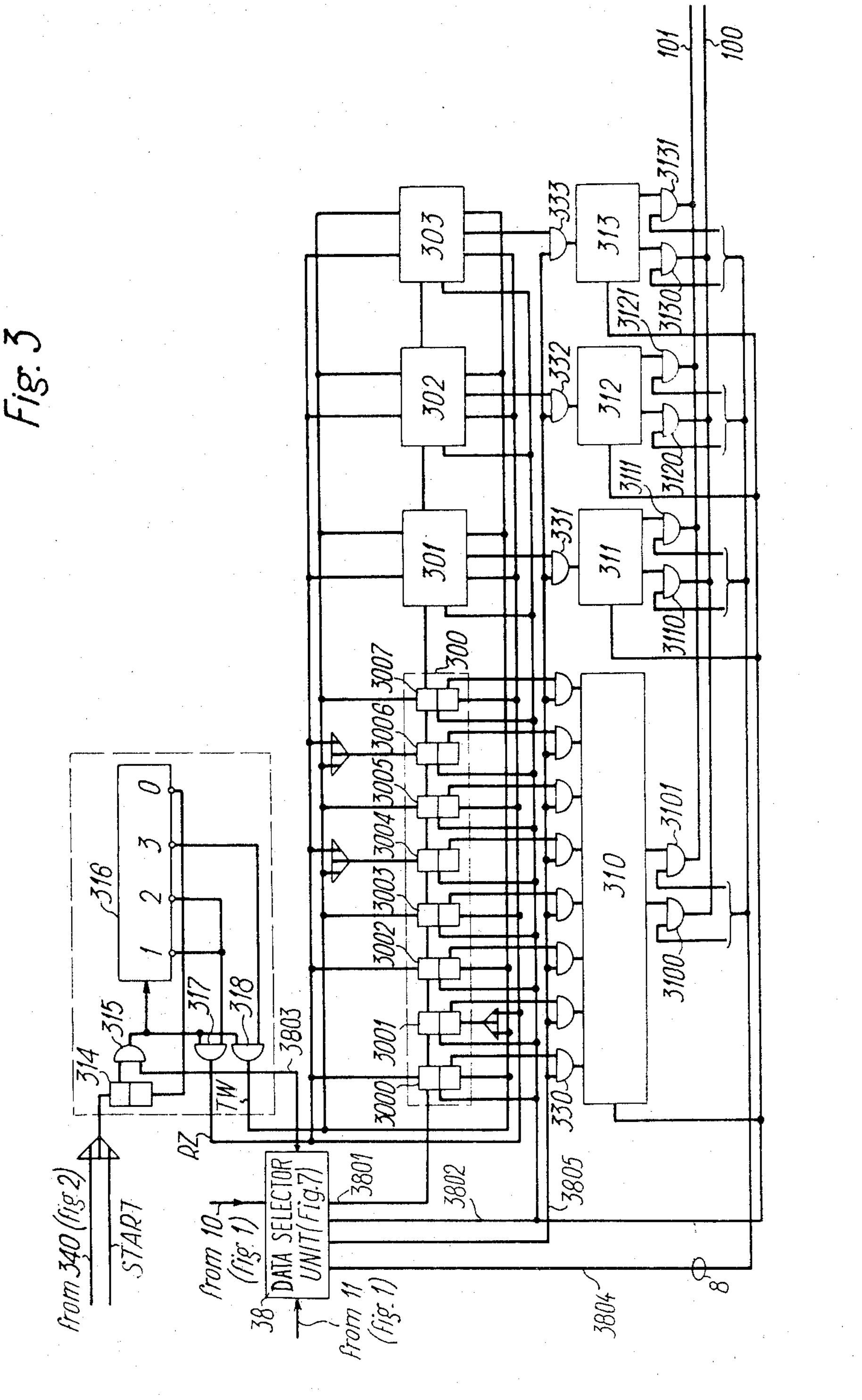
FIG. 3 illustrates in details a data transmitter equipment.

FIG. 3 illustrates the data sending equipment 31' identical to 81'. Essentially, is comprises an array of shift registers comprising a many sending shift registers 300–303 as the maximum number of simultaneous transmission time slots (simultaneous obviously meaning : forming part of the same 125 μs interval) amounting to four in this case, and a plurality (four) of buffer registers 310–313, the input terminals of the buffer registers 310–313 being connected respectively to the output terminals of the sending shift registers 300–303.

The data issuing from transmitter-receiver 10 are applied to the data selector unit 38 which re-transmits them on the output lead 3801. The data are sllowed to pass in series into one or more of the transmission shift registers 300–303. The data selector unit 38 ( a data selector unit 88 is equally present in the exchange 8) determines as already said the bit transmission rate according to the number of time slots allocated to the subscriber. The registers 300, or 300 and 301, or 300, 301 and 302, ot 300, 301, 302, 303 are filled according to whether the number of time slots is equal to 1, 2, 3 or 4.

If only one time slot is in service, the data are fed in at the rate of eight bits in 125 μs into the register 300. If four time slots are in operation at the same time, the data are fed in at the rate of 32 bits in 125 μs into the registers 300–303.

Every 125 μs, the contents of the registers 300–303 are discharged into the transmission buffer registers 310–313 through the AND gates 330–333 which are open by a signal on lead 3805. During the frame following this discharge, the data contained in the buffer registers are fed to the multiplex highways 100–101 through the AND gates 3100–3131) which are open by a signal on leads 3806. These gates are correspondingly unblocked during the time slots allocated to the calling subscriber, the gates 3100, 3101 being unblocked during the slot which has been assigned to the first word, i.e., $T_{20}$ in the example described, the gates 3110, 3111 being unblocked during the slot $T_{11}$ assigned to the second word, the gates 3120, 3121 during the slot $T_{15}$ assigned to the third word and the gates 3130, 3131 during the slot $T_4$ assigned to the fourth word. The result thereof is that the word which has been referred to as the "first word" is that which fills the register 310 and which, in practive — in view of the charging in series of the registers — is the last word of the group of two, three or four words.

Summarizing, through lead 3801, unit 38 applies the data bits to the transmission shift registers 300–303. Through lead 3802 it applies advance pulse to the transmission registers and to the transmission buffer registers. Through lead 3803, it applies frame start pulses to AND gate 315 which selects the frames during which the zero reset words are sent and the frame during which the test words are sent. Through lead 3805, it control the transfer from the transmission registers to the transmission buffer registers. And through lead 3806, it controls the transfer of the contents of the buffer registers into the sending lines during the assigned slots.

In FIG. 3, it has been assumed that there were two multiplex highways 100–101 leading towards the switching network 39. In theory, this is unnecessary if the number of data transmitting stations does not exceed the number of time slots in the frame. However, if it is assumed for example that there are 32 time slots in the frame and 64 data transmitting stations connected to the exchange, two lines are needed. The two lines establish sixty four time slots and the data selector unit 38 unblocks a gate of the set 3100, 3110, 3120, 3130 or of the group 3101, 3111, 3121, 3131 depending on whether the time slot allocated operates on the first or second highway.

The discharge of the buffer registers into the highways occurs in 3.9 μs, the duration of a time slot.

Resetting to zero is the operation preceding any measure of the propagation delays. The sequence 10101010 has been chosen as the zero-reset word and it is transmitted during two consecutive frames in all the assigned time slots when a signal originating from the error detector 340 switches the flipflop 314 to the one state. The flipflop 314 opens the AND gate 315 which opens the way to frame start pulses generated by the data selector unit 38 at the rate of one per frame of 125 μs. These pulses cause progression of the counter 316 which keeps the AND gate 317 open during two frames. The frame start pulses passing through this gate is fed into the one sides of the odd order flipflops such as 3000, 3002, 3004, 3006 of the registers 300–303, and into the zero sides of the even order flipflops such as 3001, 3003, 3005, 3007 of these registers. Thus the zero-reset word is written in one or several registers 300–303.

After the zero-reset (RZ) word has been transmitted twice, the counter 316 closes the AND gate 317 and opens the AND gate 318 which is kept open for one frame, the time to transmit a test word (TW) 00011111 in each assigned slot. It is apparent on FIG. 3 that the output wire of 318 is connected in each register 300–303 to the zero sides of the first three flipflops such as 3000, 3001, 3002 and the one sides of the last five flipflops such as 3003, 3004, 3005, 3006, 3007 as far as the register 300 is concerned.

Figure 5:
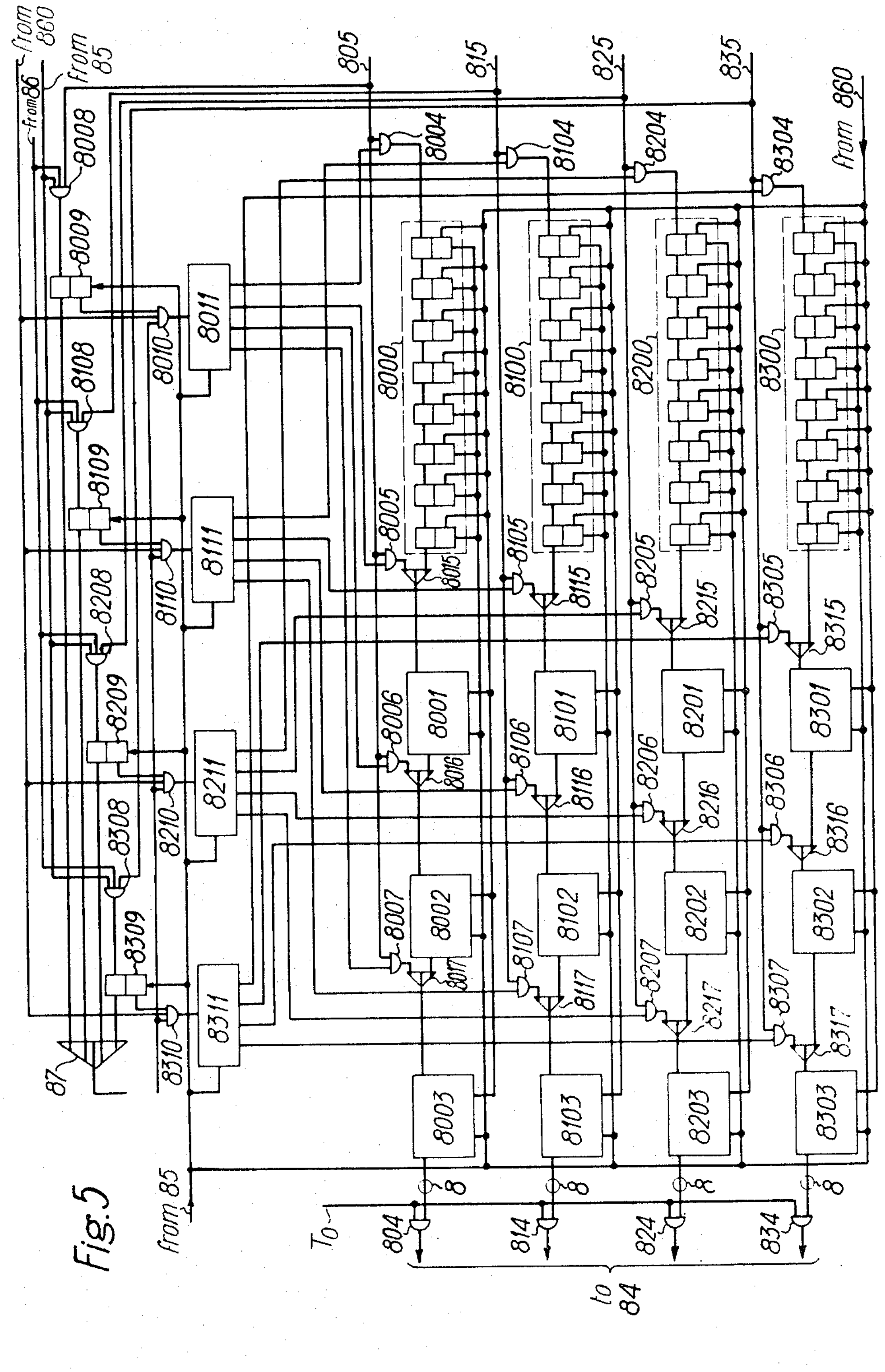
FIG. 5 illustrates the apparatus of FIG. 4 in more detailed manner.

The subscriber's equipement for reception of data is illustrated in FIGS. 4 and 5.

It comprises four groups of individual input registers 80, 81, 82, 83 whose input leads 805, 815, 825, 835 are connected to the highways 200 and 201 by AND gates 800, 801, 810, 811, 820, 821 and 830, 831 respectively, and OR gates 803, 813, 823, 833, and whose output terminals are connected to a synthesis or reconstruction register 84 by AND gates 804, 814, 824, 834. Each group of individual reception registers 80 to 83 comprises four registers of eight flipflops each, respectively 8000 to 8003, 8100 to 8103, 8200 to 8203, 8300 to 8303, and the synthesis registers 84 comprises four sections of eight flipflops 840 to 843, connected respectively to the last registers 8003, 8103, 8203, 8303.

The subscriber's reception equipement moreover comprises a zero-reset word detector 85 and a test word detector 86 whose input terminals are connected to the incoming lines 805, 815, 825, 835 respectively of the groups of reception registers through an OR gate 850. The zero-reset word detector comprises a delay circuit which inhibits the input of the detector when a zero-reset word has been received. The zero-reset word is transmitted during two consecutive frames, and only the first which is received by the detector is effective. If the first zero-reset word is faulty upon reception, it remains ineffective and the second performs the zero-reset action. This precaution is applied because is a single zero-reset word were to be transmitted, the test word which follows it could overtake the same and be detected whilst the groups of individual reception registers had not as yet been reset to zero. The output of the zero-reset word detector is connected to the zero-reset input terminal of the groups of individual reception registers 80 to 83. The zero-reset word detector 85 moreover generates a time-lagging signal whose function will be explained further on.

The groups of individual reception registers 80–83 are shown in detail in FIG. 5 which shows the individual reception registers they comprise, respectively, 8000–8003, 8100–8103, 8200–8203 and 8300–8303. The four registers of a group, of group 80 for example, are coupled in parallel to the incoming line 805, through AND gates 8004, 8005, 8006, 8007 which gates are controlled by a counter 8011. The output terminals of the registers 8000, 8001, 8002 of the group 80 are connected to the input terminals of the following registers, respectively 8001, 8002, 8003 through OR gates 8015, 8016, 8017 and the output terminals of the AND gates 8005, 8006, 8007 are connected to one of the input terminals of the OR gates 8015, 8016, 8017. As a result, the registers 8001, 8002, 8003 may be filled either direct from the line 805, or from the registers preceding them.

The AND gates 800, 810, 820, 830 are connected to the highway 200 and the AND gates 801, 811, 821, 831 are connected to the highway 201. Moreover the AND gates 800, 801, 810, 811, 820, 821, 830, 831 each receive the slot pulses from the lead 3804, and a pulse marking the number of the words, from one of the eight leads 3806. Leads 3804 and 3806 have already been represented in FIG. 7. The corresponding AND gate is open when a selected slot pulse and a word serial number pulse appear simultaneously. The groups of registers 80, 81, 82, 83 are associated respectively to the word serial numbers; the words No. 1, that is to say the words transmitted on the first selected slot are received in the group of registers 80, the words No. 2 are received in the group of registers 81, and so forth. But since, as already stated, the order of reception of the words is not the order of selection of the slots, each word having a given serial number may well be received in a given corresponding group of registers, but it is received in a particular register of this group, as will be described.

When a test word (TW) is detected by the test word detector 86, this detector transmits a signal to the gate 8008 which equally receives a signal from the zero-reset word detector 85. This signal differs from the actuel zero-reset signal which serves the purpose of zero-resetting the groups of individual reception registers 80–83; it is a time lagging signal which validates the test words received during four consecutive frames (case of three exchanges in cascade) corresponding to the maximum propagation delay of the expected test words. The coincidence of a selected slot pulse and of a word serial number pulse then opens one of the AND gates 8008, 8108, 8208, 8308 corresponding to one of the groups of individual reception registers 80-83. The opened AND gate switches one of the flipflops 8009, 8109, 8209, 8309 to the state one. The latter, whilst passing into the state one, blocks that of the gates 8010, 8110, 8210, 8310 which it controls. The other three gates remain open and receive progression pulses from the time base generator 393. In practice, the time base generator 393 is employed for both transmission and reception. To the output terminals of the AND gates 8010, 8110, 8210, 8310 are connected the counters 8011, 8111, 8211, 8311, having two stages and four output terminals. As has already been stated, the output terminals of these counters are connected, respectively, to the four access gates of the registers forming the groups of registers 80–83.

The one parts of the flipflops 8009, 8109, 8209, 8309 are connected to the four input terminals of an OR gate 87 whereof the output terminal is connected in parallel to the AND gates 8010, 8110, 8210, 8310. As a result, the counters 8011, 8111, 8211, 8311 cannot advance unless one of them is already blocked.

The operation of the data receiving equipment will now be described in respect of an example of embodiment in which the caller and the recipient are connected through three time-division exchanges 3, 6 and 8.

For example, let us assume that the connection of FIG. 1 is to be employed for data transmission, the calling subscriber being equipped with the data transmitter-receiver 10 which he wishes to connect to the reading and punching device 20 by occupying the route shown by FIG. 1 and comprising the exchanges 3, 6 and 8 connected by the time-division trunks 5 and 7.

Figure 6:
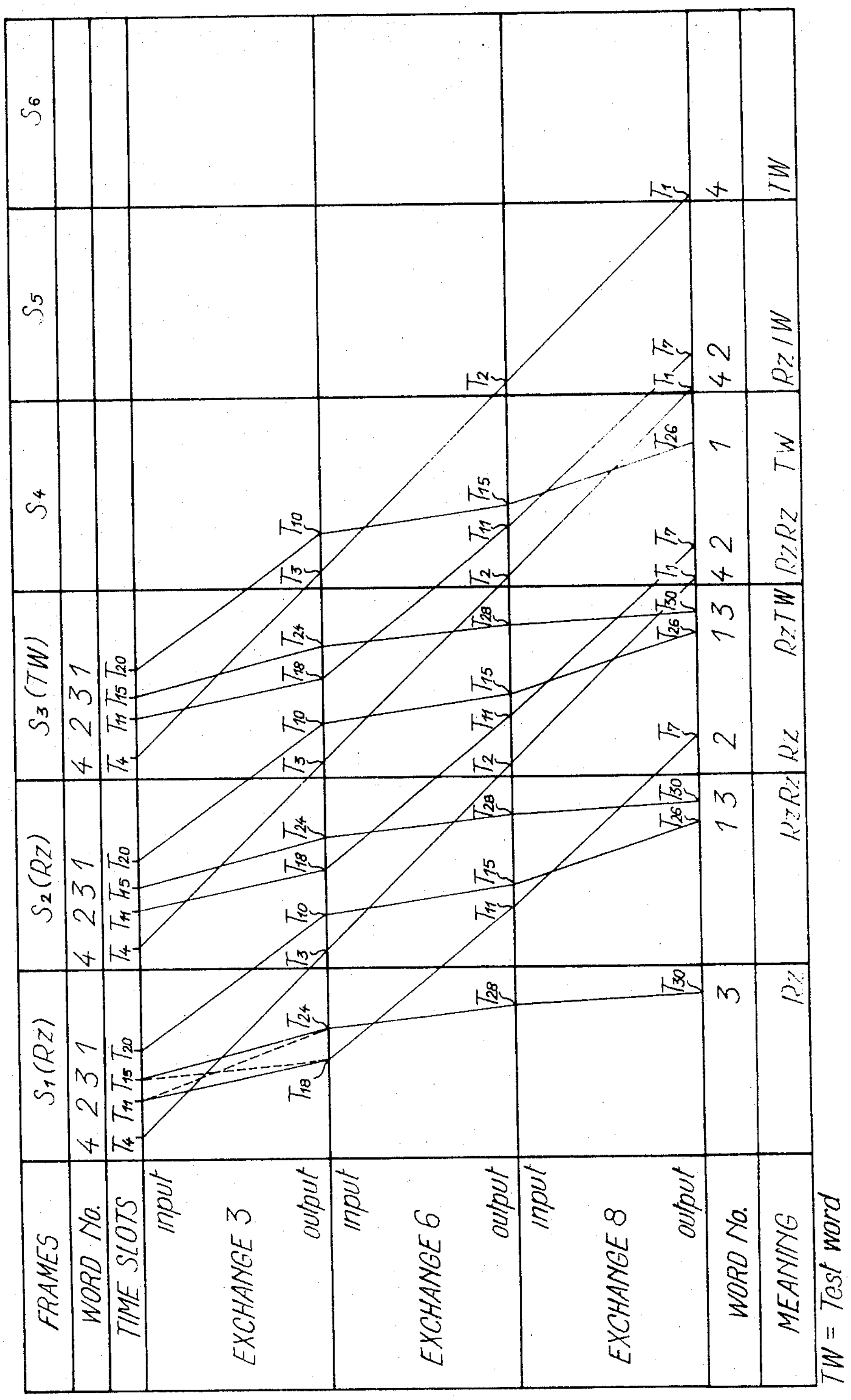
FIG. 6 is a diagram intended to explain the operation of the data transmission system of FIG. 1.

FIG. 6 illustrates the timing diagram of the connection, in which the delays of propagation in the trunks 5 and 7 have been ignored. The timers of the different exchanges have moreover been assumed to be perfectly synchronous. The only delays taken into account are those incurred during their traversals of the switching networks 39, 69, 89 by the data originating from the subscriber 1 and intended for the subscriber 2. These delays are evaluated in frames of 125 $\mu$s and the diagram starts with the frame $S_1$ which is that following the selection of the time slots. The slots $T_{20}$, $T_{11}$, $T_{15}$ and $T_4$ have been assigned to the caller and respectively to the words Nos. 1, 2, 3, 4. The slots $T_{26}$, $T_7$, $T_{30}$ and $T_1$ have been assigned to the called party and respectively to the words 1, 2, 3, 4. The data selection unit 38 has seized the time slots and stored their serial numbers and the numbers of the words to which they are assigned. Along the transmission chain, the incoming slot $T_{20}$ is connected to the outgoing slot $T_{10}$ in the network 39. This same slot is employed up to the input terminal of the switching network 69 at which it is connected to the outgoing slot $T_{15}$. This slot $T_{15}$ reaches the called subscriber's home exchange 8 and, in the switching network 89, it is connected to the outgoing slot $T_{26}$. The three other slots undergo analogous changes apparent from FIG. 6 and which may be summarized as follows:

| No. of the word assigned to the slot | Incoming slot | Outgoing slot | Delay frames between incoming and outgoing slots |
|---|---|---|---|
| 1 | $T_{20}$ | $T_{26}$ | 1 |
| 2 | $T_{11}$ | $T_7$ | 2 |
| 3 | $T_{15}$ | $T_{30}$ | 0 |
| 4 | $T_4$ | $T_1$ | 3 |

The connection being ambilateral, other slots have evidently been assigned for the other direction of transmission and it is not until after this allocation that the transmission of data can begin.

As been stated, this transmission begins with a zero-reset instruction. A zero-reset word is transmitted automatically during the frames $S_1$ and $S_2$ on all the assigned slots, and a test word follows during the frame $S_3$ and equally on all the assigned slots before the beginning, during the frame $S_7$, of the transmission of the actual message, after reception of all the test words.

The zero-reset word generated in the register 300 (FIG. 3) is thus transferred into the register 310, the register of word No. 1, then during slot $T_{20}$, is transmitted to the switching network 39.

After traversal of the different exchanges, demonstrated by the bloken line trajectory corresponding to $T_{20}$ (FIG. 6), the zero-reset word No. 1 of the register 310 reaches its destination during slot $T_{26}$ of frame $S_2$. It had been preceded by the zero-reset word No. 3 arriving in slot $T_{30}$ of frame $S_1$. If it has been transmitted correctly, it is the zero-reset word No. 3 in $S_1$ which has been able to perform its function effectively by zero-resetting the elements of the subscriber's receiving equipment. If not, it is the zero-reset word No. 1 in $S_2$ which would perform the zero resetting or, failing this, the zero-reset word No. 3 in $S_2$. If this zero-reset action cannot be ordered except during frame $S_4$, whereas the test word No. 3 had appeared previously, the zero-reset action will have to be repeated after the time-lag imposed by the detector 85 (FIG. 4).

However, assuming the effective zero-reset action to have been performed by the zero-reset word No. 3 in $S_1$, all the other zero-reset words received subsequently will be ineffective, and the first test word, word No. 3 resching the receiving equipment during slot $T_{30}$ in frame $S_3$ will be sent to the group of individual reception registers 82 of FIG. 4 through the AND gate 821 which had been opened by the pulse corresponding to slot $T_{30}$ and the pulse corresponding to the word serial number No. 3. This test word No.3 reaches the test word detector 86 which transmits to the flipflop 8209 of the group of registers 82, a signal for changing over to the state one, thus blocking the gate 8210 and thereby the counter 8211 and unblocking the other counters 8011, 8111, 8311 of the adjacent groups because the AND gates 8010, 8110, 8310 receive a signal from the OR gate 87. The next words of the actual message intended for the register group 82 will be accommodated in the register 8200 of this group, the AND gate 8204 being kept open by the counter 8211 in its first position.

The slot $T_0$ not employed for transmission, then intervenes; a signal is transmitted by the time base generator 393 to the gates 8010, 8110, 8210, 8310 of counters 8011, 8111, 8211, 8311 which are all open except 8210. Therefore, the counters 8011, 8111, 8311, advance by one step, which established the opening of the AND gates 8005, 8105 and 8305, the other gates such as 8006, 8007, 8106, 8017, 8306, 8307 remaining blocked.

The test word No. 1 for which the register group 80 is available in the same conditions previously applying for the register 82, reaches the receiving equipment during the slot $T_{26}$ of frame $S_4$.

Upon reception of a signal from the test word detector 86, the flipflop 8009 has changed its state, blocked the AND gate 8010 and confirmed the opening of the other gates 8110, 8310 (8210 is already blocked) by the OR gate 87. The words No. 1 of the message will be accomodated in the register 8001 of the register group 80.

The zero-reset words No. 4 transmitted during frame $S_1$ and No. 2 transmitted during frame $S_2$ have been received during the same frame $S_4$, but it has been stated that the zero-reset words received after the effective zero-reset action remain ineffective.

The zero-reset word No. 4 transmitted during frame $S_2$ and which is received in the slot $T_1$ during frame $S_5$ is also inoperative. Only the test word No. 2 received in $T_7$ of frame $S_5$ is considered by the detector 86, and as previously, this detector places the flipflop 8109 of the group of registers 81 in the state one, blocks the gate 8110 and stops the counter 8111 in the position maintaining the opening of the AND gate 8106 through which are received the data of the message words No. 2 intended for the register 8102. The frame $S_5$ terminates. During $T_0$, the counter 8311 of the group of registers 83 advances by one step, and when the test word No. 4 is received in $T_1$ of frame $S_6$, the register 8303 is thus available to record the words arriving in this time slot.

To summarize, the word No. 3 appears in the register group 82 with delay of zero frame the word No. 1 appears in the register group 80 with a delay of one frame, the word No. 2 appears in the register group 81 with a delay of two frames, and the word No. 4 appears in the register group 83 with a delay of three frames.

It is at the same time that the message words will reach the synthesis register 84 through the gates 804, 814, 824, 834 for extraction from the same in the order specified, as apparent from the following table:

| Entry into | Frame $S_7$ | Frame $S_8$ | Frame $S_9$ | Frame $S_{10}$ |
|---|---|---|---|---|
| register group **80** | — | M1 | M1 | M1 |
| register group **81** | — | — | M2 | M2 |
| register group **82** | M3 | M3 | M3 | M3 |
| register group **83** | — | — | — | M4 |

M=message word.

It is apparent that the words are lined up in the appropriate order during the frame $S_{10}$; during the frame $S_{11}$ which is that during which they are present in the register 84, they are ready for extraction from this register.

What is claimed is:

1. Digital data message transmission system between a data transmitter and a data reciever connected by a route transiting through a chain of time division switching networks, said time division switching networks having means for defining recurrent slots grouped in frames and means for connecting incoming slots entering into the switching networks to outgoing slots issuing therefrom, said digital data message transmission system using a number of slots selected by the data transmitter according to the data flow to be transmitted and comprising means situated in the transmitter for cyclic severance of the digital data message into a number of words equal to the selected slot number, means situated in the transmitter and the receiver for successively selecting incoming and outgoing slots in a number equal to said selected slot number and means for respectively assigning said selected incoming and outgoing slots to the words, whereby each word of the digital data message is associated to an incoming slot and to an outgoing slot, means situated in the transmitter for transmitting the words in their associated selected incoming slots, an array of identical reception shift registers situated in the receiver and respectively associated with the wrods, each reception shift register being split up into a number of sections respectively associated with the frames of the selected outgoing slots, means for receiving each given word in its associated reception shift register and in the section thereof associated with the frame during which the selected outgoing slot associated with said given word is received and a synthesis shift register having a number of sections equal to the selected slot number and respectively connected to the last sections of the reception shift registers.

2. Digital data message transmission system between a data transmitter and a data receiver connected by a route transiting through a chain of time division switching networks, said time division switching networks having means for defining recurrent slots grouped in frames and means for connecting incoming slots entering into the switching networks to outgoing slots issuing therefrom, said digital data message transmission system using a number of slots selected by the data transmitter according to the data flow to be transmitted and comprising means situated in the transmitter for cyclic severance of the digital data message into a number of words equal to the selected slot number means situated in the transmitter and the receiver for successively selecting incoming and outgoing slots in a number equal to said selected slot number and means for respectively assigning said selected incoming and outgoing slots to the words, whereby each word of the digital data message is associated to an incoming slot and to an outgoing slot, means situated in the transmitter for transmitting one and the same particular word through all the selected incoming slots, an array of identical reception shift registers situated in the receiver and respectively associated with the words, each reception shift register being split up into a number of sections respectively associated with the frames of the selected outgoing slots, each reception shift register and each reception shift register section having an access gate, means for receiving said particular word in all the selected outgoing slots, means controlled by said receiving means for deriving from the serial number of an outgoing slot assigned to a given word the reception shift register associated with said given word and opening the access gate thereof, means controlled by said receiving means for deriving from the frame of said outgoing slot the section of said reception shift register and opening the access gate thereof, means situated in the transmitter for transmitting the words in their associated selected incoming slots and a synthesis shift register having a number of sections equal to the selected slot number and respectively connected to the last sections of the reception shift register.

* * * * *